(12) United States Patent
Vincent et al.

(10) Patent No.: US 8,368,667 B2
(45) Date of Patent: Feb. 5, 2013

(54) METHOD FOR REDUCING LATENCY WHEN USING MULTI-TOUCH GESTURE ON TOUCHPAD

(75) Inventors: Paul Vincent, Fruit Heights, UT (US); Richard D. Woolley, Orem, UT (US)

(73) Assignee: Cirque Corporation, Salt Lake City, UT (US)

( * ) Notice: Subject to any disclaimer, the term of this patent is extended or adjusted under 35 U.S.C. 154(b) by 672 days.

(21) Appl. No.: 12/492,937

(22) Filed: Jun. 26, 2009

(65) Prior Publication Data

US 2010/0053099 A1    Mar. 4, 2010

Related U.S. Application Data

(60) Provisional application No. 61/075,973, filed on Jun. 26, 2008.

(51) Int. Cl.
*G06F 3/045*      (2006.01)
(52) U.S. Cl. ......................................... 345/174; 345/175
(58) Field of Classification Search .......... 345/156–179; 178/18.01–18.07, 19.01–19.07
See application file for complete search history.

(56) References Cited

U.S. PATENT DOCUMENTS

| | | | | |
|---|---|---|---|---|
| 2010/0141589 A1* | 6/2010 | Hoover | ......................... | 345/173 |
| 2010/0141590 A1* | 6/2010 | Markiewicz et al. | ......... | 345/173 |
| 2010/0281416 A1* | 11/2010 | Fuyuno | ......................... | 715/773 |
| 2010/0283742 A1* | 11/2010 | Lam | ............................... | 345/173 |
| 2010/0283743 A1* | 11/2010 | Coddington | .................. | 345/173 |
| 2010/0315438 A1* | 12/2010 | Horodezky et al. | ........... | 345/661 |
| 2011/0109578 A1* | 5/2011 | Waller et al. | .................. | 345/173 |
| 2011/0126097 A1* | 5/2011 | Isono | ............................ | 715/702 |
| 2011/0288997 A1* | 11/2011 | McBride | ........................ | 705/44 |
| 2011/0304584 A1* | 12/2011 | Hwang | ......................... | 345/174 |
| 2012/0013569 A1* | 1/2012 | Swedin | ......................... | 345/174 |

* cited by examiner

*Primary Examiner* — Vijay Shankar
(74) *Attorney, Agent, or Firm* — Morriss O'Bryant Compagni, PC

(57) ABSTRACT

A method for executing single and multi-touch gestures that will be immediately recognized by the touchpad without having to wait for any portion of the gesture to be performed, thereby eliminating latency that can be caused by the touchpad or touchscreen having to wait for a portion of the gesture to be performed.

13 Claims, 3 Drawing Sheets

METHOD FOR REDUCING LATENCY WHEN USING MULTI-TOUCH GESTURE ON TOUCHPAD

CROSS REFERENCE TO RELATED APPLICATIONS

This document claims priority to, and incorporates by reference all of the subject matter included in the provisional patent application Ser. No. 61/075,973 and filed on Jun. 26, 2008.

BACKGROUND OF THE INVENTION

1. Field of the Invention

This invention relates generally to methods of providing input to a touchpad. Specifically, the invention relates to a method of reducing latency that a touchpad or touch-sensitive screen might experience when executing single and multi-touch gestures.

2. Description of Related Art

Electronic appliances are now performing more and more functions in all parts of our daily lives. There is a need for more and better ways to use and control both portable and non-portable electronic appliances.

The ubiquitous touchpad and touchscreen are being integrated into an ever increasing array of products because touch is a preferred method of interaction with electronic appliances. A short list of portable electronic appliances demonstrates that users are already benefiting from using a touch sensitive surface as a means of providing user input. These portable electronic appliances include, but should not be considered limited to, music players, DVD players, video file players, personal digital assistants (PDAs), digital cameras and camcorders, mobile telephones, laptop and notebook computers, global positioning satellite (GPS) devices and many others. Even stationary electronic appliances such as desktop computers can take advantage of an improved system and method of providing input to a touchpad (hereinafter the term "touchpad" will also refer to a "touchscreen") that provides greater functionality to the user.

One of the main problems that many portable and non-portable electronic appliances have is that their physical dimensions limit the number of ways in which interacting with the appliances is possible. There is typically a very limited amount of space that is available for an interface when portability is an important feature. For example, mobile telephones often referred to as smart phones are now providing the functions of a telephone and a personal digital assistant (PDA). Typically, PDAs require a significant amount of surface area for input and a display screen in order to be practical.

A key aspect of using any small electronic appliance, and especially a device that includes a display, is reducing frustration when dealing with the device. If interaction with the device is difficult, then it won't be used. Thus, new systems and methods of interacting with touchpads are being created to improve the user experience.

A relatively new method of user input using a touchpad is the use of multi-touch gestures. Specifically, a user uses multiple pointing objects, such as a finger and a thumb, to perform a gesture on or near the touchpad. Different objects and more objects can also be used. The gesture is then interpreted as a command for controlling some function that can be performed on or by the electronic appliance. For example, a pinching motion with a finger and thumb can be interpreted as a gesture command for controlling a zoom function on a display screen.

Before describing the new method for reducing latency when using a touchpad that can accept multi-touch input, it is useful to describe one embodiment of touchpad technology that can be used in the present invention. Specifically, the capacitance-sensitive touchpad technology of CIRQUE® Corporation can be used to implement the present invention. The CIRQUE® Corporation touchpad is a mutual capacitance-sensing device and an example is illustrated in FIG. 1. The touchpad can be implemented using an opaque surface or using a transparent surface. Thus, the touchpad can be operated as a conventional touchpad or as a touch sensitive surface on a display screen, and thus as a touch screen.

In this touchpad technology of CIRQUE® Corporation, a grid of row and column electrodes is used to define the touch-sensitive area of the touchpad. Typically, the touchpad is a rectangular grid of approximately 16 by 12 electrodes, or 8 by 6 electrodes when there are space constraints. Interlaced with these row and column electrodes is a single sense electrode. All position measurements are made through the sense electrode. However, the row and column electrodes can also act as the sense electrode, so the important aspect is that at least one electrode is driving a signal, and another electrode is used for detection of a signal.

In more detail, FIG. 1 shows a capacitance sensitive touchpad 10 as taught by Cirque® Corporation includes a grid of row (12) and column (14) (or X and Y) electrodes in a touchpad electrode grid. All measurements of touchpad parameters are taken from a single sense electrode 16 also disposed on the touchpad electrode grid, and not from the X or Y electrodes 12, 14. No fixed reference point is used for measurements. Touchpad sensor control circuitry 20 generates signals from P,N generators 22, 24 that are sent directly to the X and Y electrodes 12, 14 in various patterns. Accordingly, there is a one-to-one correspondence between the number of electrodes on the touchpad electrode grid, and the number of drive pins on the touchpad sensor control circuitry 20.

The touchpad 10 does not depend upon an absolute capacitive measurement to determine the location of a finger (or other capacitive object) on the touchpad surface. The touchpad 10 measures an imbalance in electrical charge to the sense line 16. When no pointing object is on the touchpad 10, the touchpad sensor control circuitry 20 is in a balanced state, and there is no signal on the sense line 16. There may or may not be a capacitive charge on the electrodes 12, 14. In the methodology of CIRQUE® Corporation, that is irrelevant.

When a pointing device creates imbalance because of capacitive coupling, a change in capacitance occurs on the plurality of electrodes 12, 14 that comprise the touchpad electrode grid. What is measured is the change in capacitance, and not the absolute capacitance value on the electrodes 12, 14. The touchpad 10 determines the change in capacitance by measuring the amount of charge that must be injected onto the sense line 16 to reestablish or regain balance on the sense line.

The touchpad 10 must make two complete measurement cycles for the X electrodes 12 and for the Y electrodes 14 (four complete measurements) in order to determine the position of a pointing object such as a finger. The steps are as follows for both the X 12 and the Y 14 electrodes:

First, a group of electrodes (say a select group of the X electrodes 12) are driven with a first signal from P, N generator 22 and a first measurement using mutual capacitance measurement device 26 is taken to determine the location of the largest signal. However, it is not possible from this one measurement to know whether the finger is on one side or the other of the closest electrode to the largest signal.

Next, shifting by one electrode to one side of the closest electrode, the group of electrodes is again driven with a signal. In other words, the electrode immediately to the one side of the group is added, while the electrode on the opposite side of the original group is no longer driven.

Third, the new group of electrodes is driven and a second measurement is taken.

Finally, using an equation that compares the magnitude of the two signals measured, the location of the finger is determined.

Accordingly, the touchpad 10 measures a change in capacitance in order to determine the location of a finger. All of this hardware and the methodology described above assume that the touchpad sensor control circuitry 20 is directly driving the electrodes 12, 14 of the touchpad 10. Thus, for a typical 12×16 electrode grid touchpad, there are a total of 28 pins (12+16=28) available from the touchpad sensor control circuitry 20 that are used to drive the electrodes 12, 14 of the electrode grid.

The sensitivity or resolution of the CIRQUE® Corporation touchpad is much higher than the 16 by 12 grid of row and column electrodes implies. The resolution is typically on the order of 960 counts per inch, or greater. The exact resolution is determined by the sensitivity of the components, the spacing between the electrodes on the same rows and columns, and other factors that are not material to the present invention.

Although the CIRQUE® touchpad described above uses a grid of X and Y electrodes and a separate and single sense electrode, the sense electrode can also be the X or Y electrodes by using multiplexing. Either design will enable the present invention to function.

The underlying technology for the CIRQUE® Corporation touchpad is based on capacitive sensors. However, other touchpad technologies can also be used for the present invention. These other proximity-sensitive and touch-sensitive touchpad technologies include electromagnetic, inductive, pressure sensing, electrostatic, ultrasonic, optical, resistive membrane, semi-conductive membrane or other finger or stylus-responsive technology.

It would be an advantage over the prior art to provide a new method for using a touchpad that is capable of single and multi-touch gestures, wherein there is no latency in touchpad operation when either type of gesture is being executed.

BRIEF SUMMARY OF THE INVENTION

In a preferred embodiment, the present invention is a method for executing single and multi-touch gestures that will be immediately recognized by the touchpad without having to wait for any portion of the gesture to be performed, thereby eliminating latency that can be caused by the touchpad or touchscreen having to wait for all or a portion of the gesture to be performed.

In a first aspect of the invention, existing touchpad and touchscreen hardware and scanning routines can be used with the present invention.

In a second aspect of the invention, touchdown with a single pointing object is defined as always performing the same function, such as cursor control.

In a third aspect of the invention, touchdown with two or more pointing objects is immediately defined as a specific gesture, without any tracing of the gesture on the touchpad.

In a fourth aspect of the invention, parameters needed for performance of a gesture are generated by movement of one or more pointing objects after touchdown and after immediate recognition of the gesture.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Reference will now be made to the drawings in which the various elements of the present invention will be given numerical designations and in which the invention will be discussed so as to enable one skilled in the art to make and use the invention. It is to be understood that the following description is only exemplary of the principles of the present invention, and should not be viewed as narrowing the claims which follow.

A problem that has arisen with touchpads that are capable of both single and multi-touch input gestures is that there can be a delay between the beginning of a gesture and performance of a command associated with the gesture. In other words, the specific gesture being performed might not be recognized until a substantial portion of the gesture has been executed. This delay or latency of the touchpad to respond to a command associated with a gesture can lead to frustration by a user because of a perception that the touchpad is operating in a slow manner.

Figure 1:
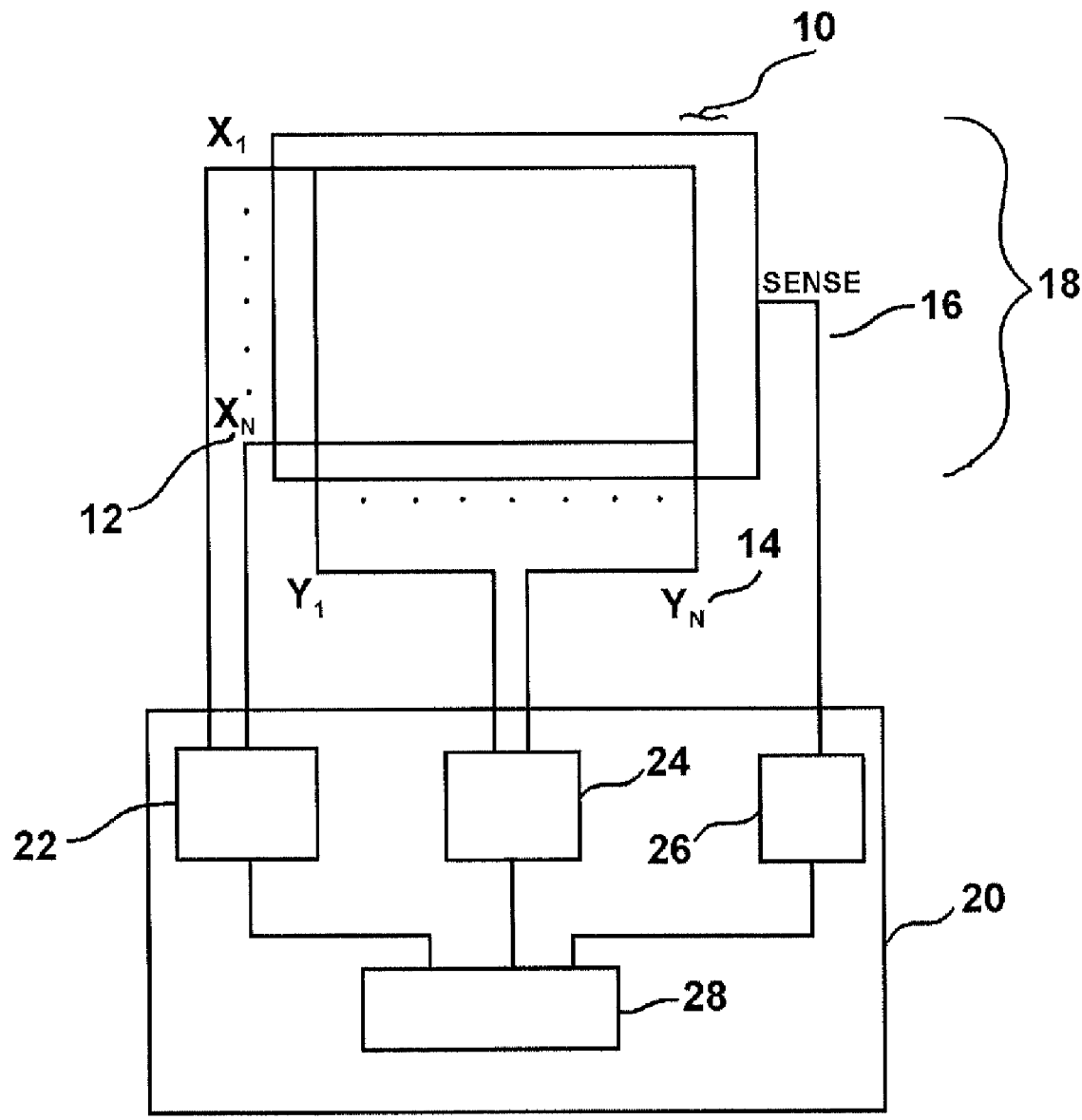
FIG. 1 is a schematic block diagram of a prior art touch sensor circuit and an electrode grid of a capacitance sensitive touchpad.
Figure 2:
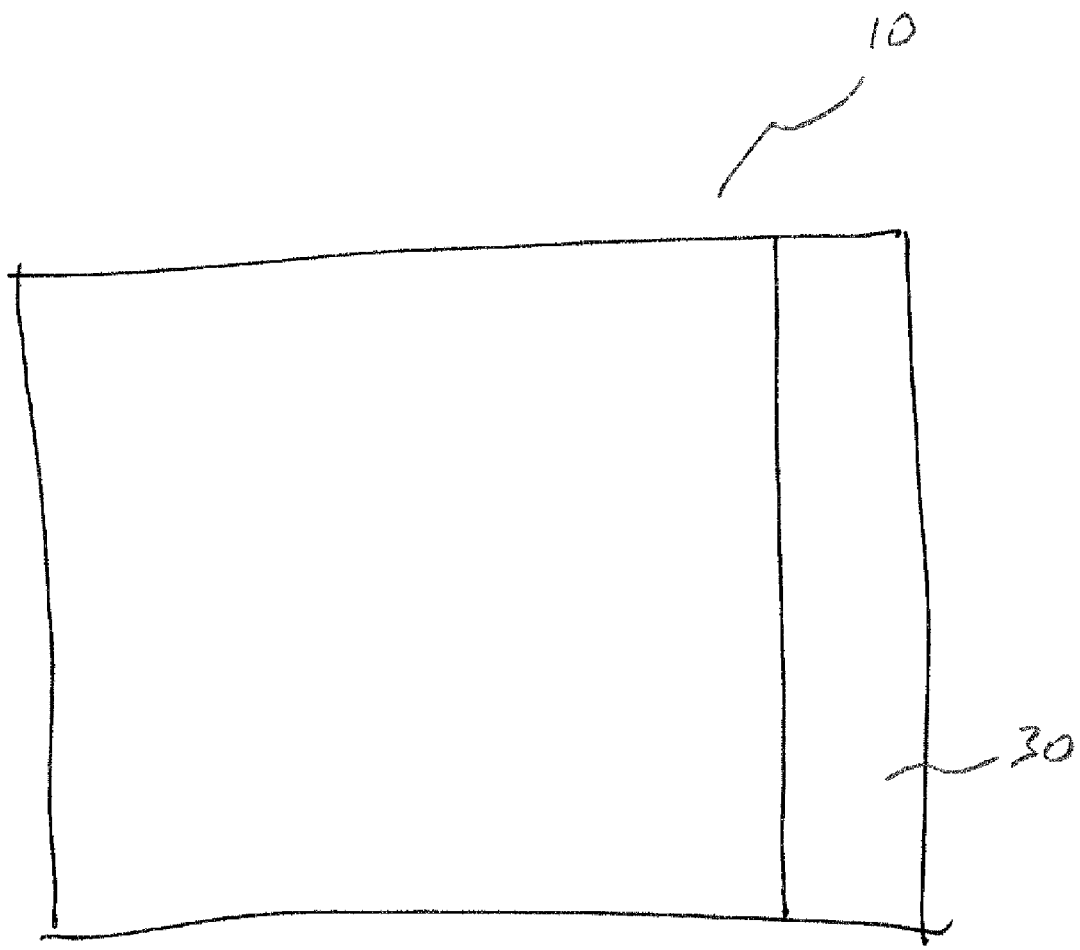
FIG. 2 is a top view of a touchpad of the present invention showing a scrolling region and a general purpose touchpad area.

A second and related problem is caused by touchdown by a single pointing object in certain regions of the touchpad 10. A touchpad 10 can use touchdown within specific regions on the touchpad as indicators of what functions are to be performed by a single pointing object. For example, as shown in FIG. 2, a scrolling region 30 is shown on the right edge of the touchpad 10. The user can enable the scrolling function by making touchdown by a single pointing object within this scrolling region 30, and then control the speed and direction of scrolling by moving the finger outside or inside the scrolling region. Unfortunately, a user intending to perform a cursor control function can make touchdown within the scrolling region 30, and be unable to move a cursor on a display screen until the scrolling function has been deactivated. Thus, a user can make touchdown with a single pointing object in various regions that are intended to engage a function that is not cursor control.

Figure 3:
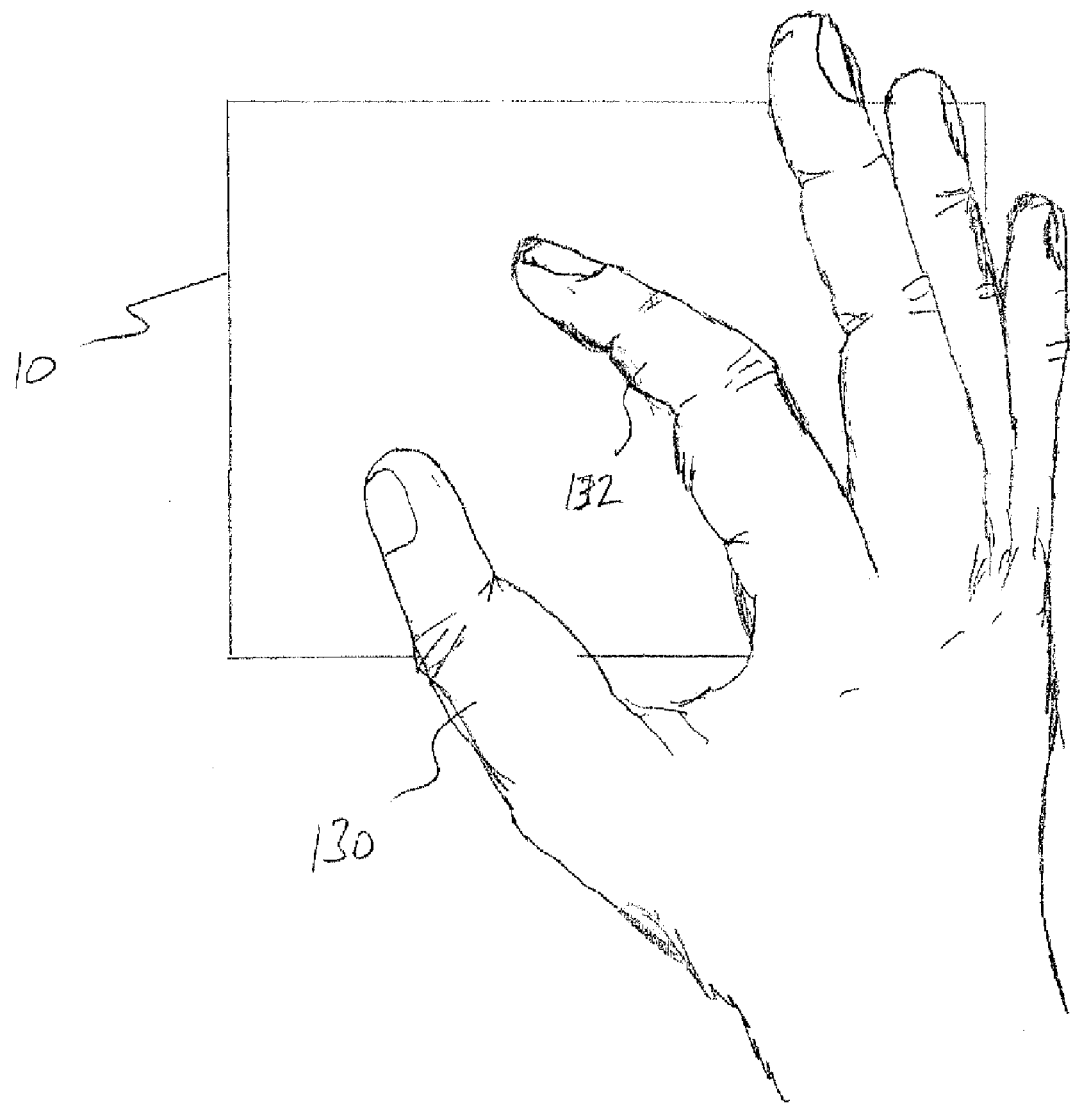
FIG. 3 is a top view of a touchpad of the present invention showing a user's hand with a thumb and forefinger touching the surface thereof.

An example of what can happen when performing a multi-touch gesture is illustrated in FIG. 3. In FIG. 3, two objects are placed on the touchpad 10. These two objects are a thumb 130 and a forefinger 132 of a user's right hand. Touchdown of the objects 130, 132 on the touchpad 10 may not be simultaneous. The result is that an algorithm for single-object detection and tracking might be executed by the touchpad. This is not considered a problem because the second pointing object makes touchdown very quickly, and thus movement of the cursor is unlikely to occur as the finger and thumb are not yet moving. The problem arises when touchdown of the second pointing object does not immediately result in the execution of a multi-touch gesture.

The problem described above that can occur when performing a multi-touch gesture is due to latency caused by having to wait while a portion of the gesture is being executed to determine which gesture it is. There are several different scenarios in which multiple fingers can be on a touchpad for different reasons. First, multiple fingers may be placed on a touchpad unintentionally, and no multi-touch gesture is going to be performed. Second, there may be more than one gesture that begins with multiple fingers being present on the touchpad 10. Thus, it may not be possible to determine which multi-touch gesture is being executed until a significant portion of the gesture has been performed.

The present invention is a method for reducing latency on a touchpad that is capable of using gestures. These gestures are either multi-touch, a combination of single and multi-touch, or a large object gesture, as will be explained. A key aspect of the invention is that the method provides immediate certainty as to which gesture is being performed as soon as one or more pointing objects (typically a combination of fingers and a thumb) make touchdown on the touchpad 10. This certainty is accomplished by applying the following conventions in the firmware or in a software driver of the touchpad 10.

The first aspect of the present invention is that whenever a single pointing object is detected as making contact with the touchpad, the function to be performed is always going to be a cursor control function (or whatever function is to be assigned to a single pointing object). Thus, regardless of what dedicated regions there may be arranged on a general purpose cursor control area on the touchpad, touchdown by a single pointing object (such as a finger) will immediately result in cursor control, which is also known as a pointing function.

It is noted that there may be some slight delay between touchdown of a first pointing object and a second pointing object. There can be many unintended consequences of moving a cursor when the cursor should not be moved. These consequences include an object being dragged across the display, an object on the display being selected or de-selected, or the cursor may move from or to a region of the display that is not desired. Nevertheless, it is believed that activation of the cursor control mode for a very brief time as two pointing or more pointing objects are making touchdown will be unlikely to result in unintended consequences.

The second aspect of the present invention is that whenever two or more fingers are detected as making contact with the touchpad 10, the function to be performed is determined at the time of touchdown. In other words, no movement of the pointing objects is necessary in order to determine which gesture is being executed. The gesture itself may continue, for example, in order to provide the input parameters necessary to perform the function associated with the gesture. Thus, if a scrolling function is being performed, the initial touchdown on the touchpad will activate the scrolling function. Then, movement by one or more pointing objects will result in scrolling of a list or other feature as determined by the specific requirements of the scrolling gesture.

What is important in the two aspects above is that 1) a single pointing object making contact with the touchpad immediately enables cursor control (or other programmable function), and 2) two or more pointing objects making contact with the touchpad will perform some function other than cursor control, and the determination of which function will be executed is determined at the moment of touchdown and not as a result of any movement of the pointing objects. After touchdown, movement of one or more of the pointing objects is only for the purpose of providing input for the specific gesture being performed, such as how far to scroll, which direction to scroll, how much to zoom in or out, how much to increase or decrease volume, etc.

The present invention must therefore provide a means for immediate determination of which function is to be performed when two or more pointing objects are detected on the touchpad. Multiple pointing objects can indicate which gesture is to be performed in the following manner.

The first way in which multiple pointing objects can indicate their function at touchdown is by making a gesture with a specific number of objects making contact with the touchpad. For example, three objects making touchdown might always indicate a tap function. Four objects making touchdown might always indicate a double tap function. The specific function is programmable in the firmware or other software such as a driver associated with the touchpad, and can be changed as desired.

The second way that multiple pointing objects can indicate their function at touchdown is by having one or more pointing objects make contact with the touchpad within a specific region. For example, one or more pointing objects makes contact within a region, and at least one other pointing object makes contact anywhere on the touchpad, possible within but probably outside the region. Thus, regions are defined for specific functions. If at least one pointing object is within a specific region when the multiple pointing objects make touchdown, then the function associated with that region is activated.

The third way that multiple pointing objects can indicate their function at touchdown is by the physical relationship between the pointing objects. For example, two pointing objects held close together so that they are touching will result in a specific function, such as scrolling. Three pointing objects held close together so that they are touching might be a different function such as page turning, with the direction being determined by a swipe across the touchpad.

In the alternative, the multiple pointing objects might be held apart so that there is a substantial amount of space between each pointing object. In this case, a "substantial amount" of space is defined as being an amount such that the multiple pointing objects can be detected by the touchpad hardware as distinct objects with at least a recognizable amount of space between them. Alternatively, the physical relationship might include a combination of pointing objects touching and pointing objects being held apart.

The present invention has used as its premise that the number of pointing objects on the touchpad can be determined. In the alternative, it is not necessary to be able to determine the exact number of pointing objects on the touchpad. Using the CIRQUE® Corporation hardware of the present invention, it is possible to perform all of the objectives described above without even knowing if there are multiple objects.

Using the hardware of the present invention, it is possible to determine that an object is large or small by only examining the outer boundaries of detected objects. Thus, if a touchpad is rectangular, the touchpad hardware uses a detection algorithm that moves from an outer edge or boundary of the touchpad and proceeds inwards or across the touchpad. The detection algorithm from each of the four edges of the touchpad stops when an edge of a pointing object is detected. If the detected object has boundaries that show it is larger than some threshold value, then the detected object can be considered to be a large object. A large object can thus be substituted for multi-touch objects when using gestures.

To use a large object in place of a multi-touch object when performing a gesture, it is possible to modify the detection algorithms. For example, a large object that uses two fingers can be a first gesture, a large object that uses three fingers can be a second gesture, etc. Another example is to make the large object make touchdown with at least part of the large object making contact within a specific region of the touchpad. Thus, touchdown with part of the large object in a first region performs a tap, double tap, scrolling, or other desired function. For example, touchdown of a large object in the top half of at least part of a scroll region will cause scrolling in an upward direction. Likewise, touchdown of the large object in the lower half of at least part of a scroll region will cause scrolling in a downward direction.

To make the present invention more accurate, it is possible to teach the system the size of certain large objects. Thus if a user wants to use two fingers for one gesture and three fingers for another, it may be necessary to record the sizes of the different objects. The system can then make a comparison between a detected object and a database of stored objects to determine which of the large objects is being detected. This is especially useful because users are likely to have fingers that are very different in size.

It is to be understood that the above-described arrangements are only illustrative of the application of the principles of the present invention. Numerous modifications and alternative arrangements may be devised by those skilled in the art without departing from the spirit and scope of the present invention. The appended claims are intended to cover such modifications and arrangements.

What is claimed is:

1. A method for reducing latency in recognizing a gesture on a touch-sensitive surface, said method comprising the steps of:
   1) making touchdown on a touch-sensitive surface with at least one pointing object; and
   2) immediately recognizing which function is to be performed by the at least one pointing object without having to wait and determine which gesture is being performed from an analysis of movement of the at least one pointing object, wherein touchdown by a specific number of pointing objects is assigned a specific function that is always executed as soon as the number of pointing objects that are recognized as making touchdown on the touch-sensitive surface have been determined.

2. The method as defined in claim 1 wherein the step of making touchdown further comprises the steps of:
   1) making touchdown with a single pointing object; and
   2) performing a function associated with touchdown of the single pointing object.

3. The method as defined in claim 2 wherein the method further comprises the step of making the function associated with touchdown of the single pointing object a dynamically assigned function, where a user may select the function that is to be performed.

4. The method as defined in claim 1 wherein the step of making touchdown further comprises the steps of:
   1) making touchdown with a plurality of pointing objects; and
   2) recognizing a multi-touch gesture at touchdown based on the number of pointing objects making touchdown on the touch-sensitive surface, and not based on subsequent movement of one or more of the plurality of pointing objects.

5. The method as defined in claim 4 wherein the method further comprises the step of providing input parameters for performance of the multi-touch gesture by performing movement of one or more of the plurality of pointing objects.

6. The method as defined in claim 1 wherein the step of making touchdown further comprises the steps of:
   1) making touchdown with a plurality of pointing objects; and
   2) recognizing a multi-touch gesture at touchdown based on the number of pointing objects making touchdown on the touch-sensitive surface and not based on subsequent movement of one or more of the plurality of pointing objects, and based on at least one of the plurality of pointing objects making touchdown at least partially within a specific region of the touch-sensitive surface that is assigned to a specific function.

7. The method as defined in claim 6 wherein the method further comprises the step of providing input parameters for performance of the multi-touch gesture by performing movement of one or more of the plurality of pointing objects.

8. The method as defined in claim 1 wherein the step of making touchdown further comprises the steps of:
   1) making touchdown with a plurality of pointing objects; and
   2) recognizing a multi-touch gesture at touchdown based on the number of pointing objects making touchdown on the touch-sensitive surface, and not based on subsequent movement of one or more of the plurality of pointing objects, and by a physical distance between the plurality of pointing objects.

9. The method as defined in claim 8 wherein the method further comprises the step of assigning a function to a plurality of pointing objects when the plurality of pointing objects are closely grouped together so that the plurality of pointing objects appear to touch each other.

10. The method as defined in claim 8 wherein the method further comprises the step of assigning a function to a plurality of pointing objects when the plurality of pointing objects are not closely grouped together so that the plurality of pointing objects appear to not touch each other.

11. The method as defined in claim 8 wherein the method further comprises the step of assigning a function to a plurality of pointing objects when some of the plurality of pointing objects are closely grouped together so that some of the plurality of pointing objects appear to touch each other, and when some of the plurality of pointing objects are also spaced apart so that some of the plurality of pointing objects appear to not be touching each other.

12. A method for reducing latency in recognizing a gesture on a touch-sensitive surface, said method comprising the steps of:
   1) making touchdown on a touch-sensitive surface with a plurality of pointing objects but without having to detect and track the each of the plurality of pointing objects;
   2) determining an outer boundary of all of the plurality of pointing objects by scanning to detect the presence of one of the plurality of pointing objects by scanning from an outer edge of each of the outer edges of the touch-sensitive surface, and moving inwards until the presence is detected, thereby identifying an outer boundary of a single large object as defined by the plurality of pointing objects; and
   3) using the single large object for gesture control.

13. The method as defined in claim 12 wherein the method further comprises the step of determining if the single large object has made touchdown at least partially within a particular region of the touch-sensitive surface in order to determine which function is to be performed.

* * * * *